Patented Aug. 17, 1937

UNITED STATES PATENT OFFICE 2,090,432

AZO DYESTUFFS CONTAINING METAL IN COMPLEX UNION

Fritz Straub, Basel, and Hermann Schneider, Riehen, near Basel, Switzerland, assignors to Society of Chemical Industry in Basle, Basel, Switzerland No Drawing. Application January 22, 1936, Serial No. 60,344. In Switzerland January 24, 1935

7 Claims. (Cl. 260—12)

This invention relates to the manufacture of dyestuffs containing metal in complex union by treating with an agent yielding metal a dyestuff formed by coupling a diazotized aromatic amine having a lake-forming group with a hydroxynaphthalene and nitrating the product.

Dyestuffs which can be made by coupling a diazotized aromatic amine containing a lake-forming group with a hydroxynaphthalene are those which are derived on the one hand from a diazotized amine which contains in ortho-position to the amino-group a hydroxyl- or a carboxyl- or an alkoxy-group or which contain the salicylic acid grouping, and on the other hand from 1- or 2-hydroxynaphthalene which may contain substituents, for instance halogen or a sulfonic acid group. Diazotized amines of this kind are, for example, the diazo-compounds of ortho-aminophenols, ortho-aminonaphthols, ortho-aminobenzencarboxylic acids, ortho-aminonaphthalenecarboxylic acids, ortho-aminoalkoxybenzenes, for instance methoxy- or ethoxybenzene, as well as amino-salicylic acids; these diazo-compounds may contain further substituents, for example alkyl-, sulfo- or nitro-groups, and halogen. The nitration of the azo-dyestuff, whereby the dyestuff serving as the parent material for the process is attained, may follow one of the usual methods, in particular that described in French Patent No. 505,007.

The dyestuff may be treated with the agent yielding metal, in acid or neutral medium, in some cases even in alkaline medium, in an open vessel or under pressure. As substances yielding metal may be used, in particular those which yield chromium, but agents yielding copper, iron, aluminium, cobalt, nickel, manganese, zinc, vanadium or titanium may also be used; they are best applied in the form of their hydrates or of salts with inorganic or organic acids, for example with hydrochloric acid, sulfuric acid, formic acid, acetic acid, lactic acid, benzenesulfonic acid, naphthalenesulfonic acid, stearic acid, palmitic acid, oleic acid, or in the form of complex compounds of salts, for instance with ammonia or pyridine. The agents yielding metal may be used alone or in the presence of any additional substance usual in the manufacture of complex metal compounds of dyestuffs, for example an hydroxycarboxylic acid (tartaric acid), formic acid, alcohol, pyridine, salts of inorganic or organic acids; further, only one agent yielding metal may be used or several such agents, and may be allowed to act upon the dyestuff simultaneously or in succession. The complex metal compounds produced may contain, for each group capable of being metallized in the dyestuff molecule, less than one atom or one atom or more than one atom of metal. The treatment with the agent yielding metal may in many cases occur in the dye-bath or on the fibre.

The dyestuffs of the invention may be used for dyeing materials of any kind, for instance cotton, wool, weighted or non-weighted silk, leather, artificial silk derived from regenerated cellulose, cellulose esters and ethers, lacquers made from a cellulose base or a base of natural or artificial resin; they may also be used as pigments or in printing. They dye very varied tints and the dyeings are very fast.

The following examples illustrate the invention:—

Example 1

46.1 parts of the azo-dyestuff obtained by nitrating the azo-dyestuff of the formula

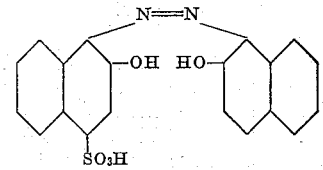

according to the process of French Patent No. 505,007, are dissolved in 800 parts of water and 5 parts of caustic soda solution of 30 per cent. strength. The solution is mixed with 150 parts of an aqueous solution of chromium fluoride, corresponding with 11.4 parts of $Cr_2O_3$, and the mixture is heated in a reflux apparatus for 12 hours. The greenish-grey chromated dyestuff thus produced is salted out, filtered and dissolved in about 500 parts of caustic soda solution of 30 per cent. strength. The solution is neutralized with strongly diluted mineral acid and the dyestuff salted out. When dry it is a grey-black powder, soluble freely in water to a blackish-violet-blue solution, which has a strong red dichroism. The dyestuff dissolves in sodium carbonate solution of 10 per cent. strength and in caustic soda solution of 10 per cent strength to a blackish-red-violet solution and in concentrated sulfuric acid to a blue-black solution. It dyes wool in a sulfuric acid bath grey tints of good fastness.

Example 2

44.5 parts of the azo-dyestuff obtained by nitrating the azo-dyestuff of the formula

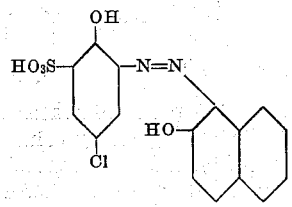

are suspended in 1,000 parts of water and mixed with 150 parts by volume of a solution of chromium formate containing 11.4 parts of $Cr_2O_3$; the mixture is boiled for about 12 hours in a reflux apparatus. The solution is then filtered from a small quantity of sparingly soluble substance and the new complex chromium compound is salted out. When dry it is a violet-black powder, soluble in water and sodium carbonate solution of 10 per cent. strength to a violet solution having red dichroism, and in caustic soda solution of 10 per cent. strength to a red-violet solution; in concentrated sulfuric acid it dissolves to a brownish-red solution. It dyes wool in a sulfuric acid bath red-violet tints of good fastness.

The nitration of the azo-dyestuff which is to be chromed follows the prescription of the French Patent No. 505,007. The nitrated azo-dyestuff is a brown-black powder which dissolves in water to a violet solution, and in concentrated sulfuric acid to a bluish red solution. In sodium carbonate solution of 10 per cent. strength and caustic soda solution of like strength it is insoluble.

Example 3

45.6 parts of the hydroxyazo-dyestuff obtained by nitrating the azo-dyestuff of the formula

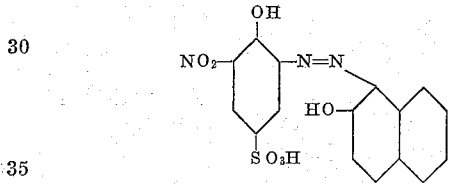

are dissolved in 800 parts of water; 120 parts of chromium formate solution, corresponding with 9.1 parts of $Cr_2O_3$ are added, and the whole is boiled under reflux for 12 hours. The new chromiferous dyestuff thus obtained is salted out. When dry it is a brownish-black powder which dissolves freely in water, sodium carbonate solution of 10 per cent. strength and caustic soda solution of 10 per cent. strength to brownish-yellow solutions. In concentrated sulfuric acid it dissolves to a bluish-red solution. It dyes wool in a sulfuric acid bath brown-violet tints of good fastness.

The nitrated parent dyestuff can be made by the process of French Patent No. 505,007. It is a black powder, soluble in water and in sodium carbonate solution of 10 per cent. strength to a red-violet solution; in caustic soda solution of 10 per cent. strength it dissolves to a red-brown solution, and in concentrated sulfuric acid to a blue-red solution.

Example 4

45.6 parts of the ortho-hydroxyazo-dyestuff obtained by nitrating the azo-dyestuff of the formula

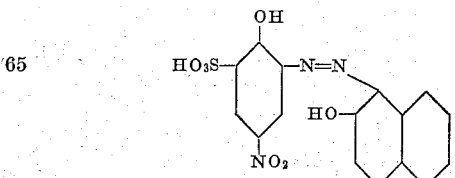

are dissolved in 800 parts of water and to this solution are added 120 parts by volume of a solution of chromium formate corresponding with 9.2 parts of $Cr_2O_3$; the mixture is boiled for 16 hours under reflux. The new chromiferous dyestuff is salted out, filtered, dissolved in dilute caustic soda solution and again salted out after neutralization with dilute formic acid. When dry it is a violet-black powder, soluble in water to a violet red solution and in sodium carbonate solution and caustic soda solution, each of 10 per cent. strength, to a brown-red solution. In concentrated sulfuric acid it dissolves to a bluish-red solution. It dyes wool in a sulfuric acid bath brown-red tints of very good fastness.

The parent dyestuff may be nitrated by the process of French Patent No. 505,007. The nitrated azo-dyestuff is a black powder, soluble in water to a red violet solution and soluble in concentrated sulfuric acid to a bluish-red solution. It dissolves in sodium carbonate solution of 10 per cent. strength and in caustic soda solution of 10 per cent. strength, sparingly to a violet-brown solution or to a reddish-blue solution.

Example 5

46.1 parts of the azo-dyestuff obtained by nitrating the azo-dyestuff of the formula

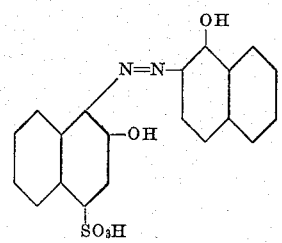

are dissolved in 900 parts of caustic soda solution of 30 per cent. strength. There are added 125 parts of chromium formate solution, corresponding with 9.8 parts of $Cr_2O_3$, and the whole is boiled under reflux for 15 hours. The new chromiferous dyestuff thus obtained is salted out. When dry it is a grey-black powder, freely soluble in water and in concentrated sulfuric acid to a blue-black solution. In sodium carbonate solution of 10 per cent. strength and in caustic soda solution of 10 per cent. strength it dissolves more sparingly to violet-black solutions. It dyes wool in a sulfuric acid bath grey tints of excellent fastness.

Instead of chromium formate, another chromium salt, for instance chromium lactate, may be used.

The nitrated azo-dyestuff used as parent substance may be obtained by the process described in French Patent No. 505,007. It is a blackish powder, soluble in water to a reddish-blue solution; in sodium carbonate solution of 10 per cent. strength to a blackish-violet-brown solution, in caustic soda solution of 10 per cent. strength to a brown-red solution and in concentrated sulfuric acid to a blackish-blue solution.

Example 6

42.5 parts of the azo-dyestuff obtained by mono-nitrating the azo-dyestuff of the formula

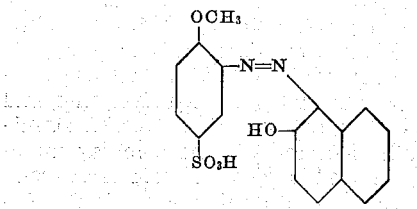

are dissolved in 1000 parts of hot water, mixed with a chromium formate solution containing 9.2 parts of $Cr_2O_3$, and heated in a pressure vessel for 8 hours to 125–130° C. From the brown-red solution thus formed the chromium compound is separated by addition of common salt. When dry it is a brown powder which dissolves in water to a blue-red solution. In sodium carbonate solution of 10 per cent. strength it dissolves to a red-violet solution, in caustic soda solution of 10 per cent. strength to a brownish-red solution and in concentrated sulfuric acid to a blue-red solution. The dyestuff dyes wool in an acid bath red-brown tints of excellent fastness.

*Example 7*

54 parts of the azo-dyestuff obtained by mono-nitrating the azo-dyestuff of the formula

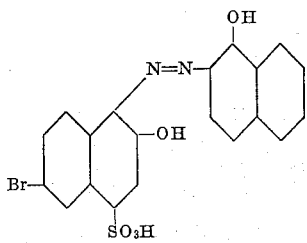

are dissolved in 1000 parts of warm water, mixed with 150 parts of a chromium fluoride solution containing 11.4 parts of $Cr_2O_3$, and boiled for about 16 hours in a reflux apparatus. The chromiferous dyestuff thus formed is salted out from the greenish-black solution. When dry it is a greenish-black powder which dissolves in water to a greenish-blue-black solution. In sodium carbonate solution of 10 per cent. strength it dissolves to a blackish-blue-violet solution, in caustic soda solution of 10 per cent. strength to a blackish violet solution, and in concentrated sulfuric acid to a grey-green solution. The dyestuff dyes wool in a mineral acid bath grey tints of good fastness.

*Example 8*

In 900 parts of hot water there are dissolved 49.1 parts of the azo-dyestuff obtained by mono-nitrating the azo-dyestuff of the formula

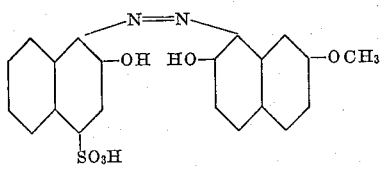

To this solution there are added 150 parts of a chromium fluoride solution containing 11.4 parts of $Cr_2O_3$, and the whole is boiled for 15 hours in a reflux apparatus. The chromiferous dyestuff thus formed is salted out from the solution which is still hot. When dry it is a black powder which dissolves in water to a violet-black solution having strong red dichroism. In sodium carbonate solution of 10 per cent. strength and caustic soda solution of 10 per cent. strength it dissolves to a blackish brown-violet solution and in concentrated sulfuric acid to a blackish violet solution. The dyestuff dyes wool in an acid bath grey to black tints of good fastness.

*Example 9*

10.8 parts of the mono-nitrated azo-dyestuff from the brominated diazo-compound of the 1-amino-2-hydroxynaphthalene-4-sulfonic acid and 1-hydroxynaphthalene are dissolved in 200 parts of hot water. To this solution there is added a concentrated solution of 5 parts of cobaltous chloride and 15 parts of crystallized sodium acetate, whereupon the whole is boiled for a short time. The cobaltiferous dyestuff thus formed is separated by salting out. When dry it is a black powder which dissolves in water, sodium carbonate solution of 10 per cent. strength and caustic soda solution of 10 per cent. strength to a brown-violet solution and in concentrated sulfuric acid to a blue-green solution. The dyestuff dyes wool in an organic acid bath blackish brown-violet tints of good fastness.

*Example 10*

8.9 parts of the mono-nitrated azo-dyestuff from diazotized 2-amino-4-chloro-1-hydroxybenzene-6-sulfonic acid and 2-hydroxynaphthalene are dissolved in 200 parts of hot water, acidified with 1.5 parts of formic acid of 85 per cent. strength, and then mixed with 2.5 parts of ammonium vanadate. The whole is boiled for 2 hours in a reflux apparatus and evaporated to dryness in a vacuum. The dyestuff containing vanadium is a brownish powder which dissolves in water and sodium carbonate solution of 10 per cent. strength to a blue-red solution and in caustic soda solution of 10 per cent. strength to a brownish solution. In concentrated sulfuric acid it dissolves to a red-orange solution. The dyestuff dyes wool in an organic acid bath fast bluish red tints of good fastness.

*Example 11*

43.9 parts of the azo-dyestuff obtained by mono-nitrating the azo-dyestuff of the formula

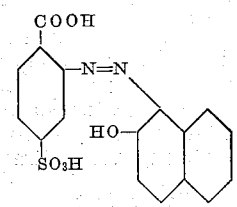

are heated in a reflux apparatus for a long time with a chromium sulfate solution, containing 8.0 parts of $Cr_2O_3$. The precipitate thus formed is dissolved by means of 10 parts by volume of caustic soda solution of 30 per cent. strength and the excess neutralized with acetic acid. The dyestuff solution is evaporated to dryness in a vacuum. The new chromium compound is a violet-brown powder which dissolves in water to a red solution, in sodium carbonate solution of 10 per cent. strength and caustic soda solution of 10 per cent. strength to a red-orange solution and in concentrated sulfuric acid to a bluish-red solution. The chromium compound dyes wool in a sulfuric acid bath red tints of very good fastness.

*Example 12*

43.9 parts of the azo-dyestuff obtained by mono-nitrating the azo-dyestuff of the formula

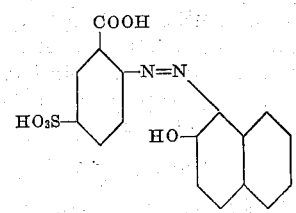

are dissolved in 1000 parts of water and heated for 18 hours in a reflux apparatus with a chromium formate solution containing 8 parts $Cr_2O_3$. The whole is then filtered from any insoluble constituents which may be admixed, and the filtrate is evaporated to dryness in a vacuum.

The new chromium compound is a violet-brown powder which dissolves in water to a red solution, in sodium carbonate solution of 10 per cent. strength and caustic soda solution of 10 per cent. strength to an orange solution, and in concentrated sulfuric acid to a bluish-red solution. The chromium compound dyes wool in a sulfuric acid bath brown-red tints of good fastness.

*Example 13*

47.7 parts of the azo-dyestuff obtained by mono-nitrating the azo-dyestuff of the formula

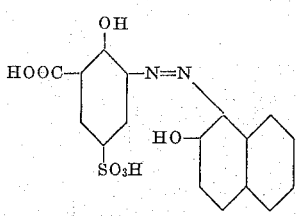

are dissolved in 1500 parts of water and the solution is heated in a reflux apparatus with a chromium fluoride solution containing 8 parts of $Cr_2O_3$ until the sodium salt dyestuff is converted completely into its chromium compound. The whole is then filtered in order to separate any insoluble constituents which may be admixed, and the dyestuff is separated by addition of common salt.

When dry it is a grey-violet powder which dissolves in water to a violet solution, in sodium carbonate of 10 per cent. strength and caustic soda solution of 10 per cent. strength to a red solution and in concentrated sulfuric acid to a bluish red solution. The new chromium compound dyes wool brown-violet tints.

*Example 14*

47.7 parts of the azo-dyestuff obtained by mono-nitrating the azo-dyestuff of the formula

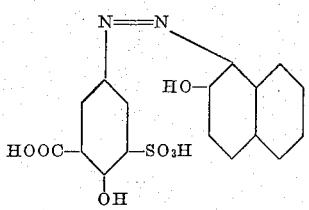

are dissolved in 1500 parts of water and the solution is heated for 20 hours in a reflux apparatus with a chromium fluoride solution containing 8 parts of $Cr_2O_3$. The new chromium compound is then separated by addition of common salt. When dry it is a brown powder which dissolves in water to a red-orange solution, in sodium carbonate solution of 10 per cent. strength and in caustic soda solution of 10 per cent. strength to an orange solution and in concentrated sulfuric acid to a bluish-red solution. The new chromium compound dyes wool yellowish-red tints of very good fastness.

*Example 15*

4.39 parts of the mono-nitrated azo-dyestuff from diazotized 1-carboxy-2-aminobenzene-4-sulfonic acid and 2-hydroxynaphthalene are dissolved in 250 parts of water and heated for a short time to boiling with a solution of 3 parts of crystallized copper sulfate in 20 parts of water. To this mixture there are added 2.75 parts of crystallized sodium acetate and boiling is continued again for a short time, whereupon the copper compound is salted out with common salt. When dry it is a brown powder which dissolves in water and sodium carbonate solution of 10 per cent. strength to a yellow solution, in caustic soda solution of 10 per cent. strength to an orange solution and in concentrated sulfuric acid to a rose-colored solution having orange dichroism. The new copper compound dyes wool in a sulfuric acid bath orange-brown tints of very good fastness.

*Example 16*

4.77 parts of the mono-nitrated azo-dyestuff from diazotized 1-hydroxy-6-carboxy-4-aminobenzene-2-sulfonic acid and 2-hydroxynaphthalene are dissolved in 250 parts of water and heated for a short time to boiling with a solution of 3 parts of crystallized copper sulfate in 20 parts of water. To this mixture there are added 2.75 parts of crystallized sodium acetate and the whole is boiled for some minutes. The copper compound is subsequently separated by addition of common salt.

When dry it is a grey-black powder which dissolves in water and sodium carbonate solution of 10 per cent. strength to an orange solution, in caustic soda solution of 10 per cent. strength to a yellow-red solution and in concentrated sulfuric acid to a rose-colored solution having orange dichroism. The copper compound dyes wool red-orange tints.

*Example 17*

4.39 parts of the mono-nitrated azo-dyestuff from the diazotized 1-carboxy-2-aminobenzene-4-sulfonic acid and 2-hydroxy-naphthalene are dissolved in 250 parts of water and boiled for a short time with a solution of 3.4 parts of crystallized nickel sulfate. To this mixture there are added 2.75 parts of crystallized sodium acetate and boiling is continued for 10 minutes. The nickel compound is separated by addition of common salt.

When dry it is a brown powder which dissolves in water, sodium carbonate solution of 10 per cent. strength and caustic soda solution of 10 per cent. strength to a reddish-yellow solution and in concentrated sulfuric acid to a red solution. The nickel compound dyes wool in an acetic acid bath orange-brown tints of good fastness.

*Example 18*

4.77 parts of the mono-nitrated azo-dyestuff from diazotized 1-hydroxy-2-amino-6-carboxy-benzene-4-sulfonic acid and 2-hydroxynaphthalene are dissolved in 250 parts of water and this solution is heated for a short time to boiling with a solution of 3.4 parts of crystallized nickel sulfate. To this mixture there are added 2.75 parts of crystallized sodium acetate and the whole is boiled again for some minutes. The nickel compound is salted out with common salt.

When dry it is a brown-black powder which dissolves in water to an orange solution, in sodium carbonate solution of 10 per cent. strength to a red solution, in caustic soda solution of 10 per cent. strength to a brown-red solution and in concentrated sulfuric acid to a rose-colored solution.

The nickel compound dyes wool in an acetic acid bath brown-red tints of good fastness.

*Example 19*

4.9 parts of the azo-dyestuff obtained by mono-nitrating the azo-dyestuff of the formula

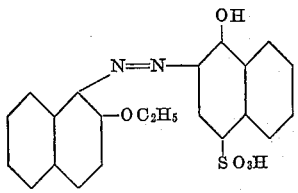

are dissolved in 100 parts of water and heated with a chromium formate solution containing 0.8 part of $Cr_2O_3$ for 8 to 10 hours to 125–130° C. When cold the whole is filtered from insoluble constituents consisting of unchanged sodium salt dyestuff and the dyestuff is separated with common salt.

When dry the chromium compound is a blackish powder which dissolves in water to a blue-violet solution, in sodium carbonate solution of 10 per cent. strength and caustic soda solution of 10 per cent. strength to a red-violet solution and in concentrated sulfuric acid to a violet-black solution. It dyes wool in a sulfuric acid bath blackish violet tints of very good fastness.

What we claim is:—

1. Dyestuffs containing metal in complex union, obtained by causing agents yielding metal to react with dyestuffs formed themselves by coupling diazotized aromatic amines containing lake-forming groups, with hydroxynaphthalenes free from carboxyl groups and nitrating the dyestuffs obtained.

2. Dyestuffs containing metal in complex union, obtained by causing agents yielding metal to react with dyestuffs formed themselves by coupling diazotized amines of the general formula

in which R represents an aryl radical from the group consisting of phenyl and naphthyl and $x$ represents a lake-forming group standing in ortho-position to the amino-group, with hydroxynaphthalenes free from carboxyl groups and nitrating the dyestuffs obtained.

3. Dyestuffs containing metal in complex union, obtained by causing agents yielding metal to react with dyestuffs formed themselves by coupling diazotized amines of the general formula

in which R represents an aryl radical from the group consisting of phenyl and naphthyl and in which the hydroxyl-group stands in ortho-position to the amino-group, with hydroxynaphthalenes free from carboxyl groups and nitrating the dyestuffs obtained.

4. Dyestuffs containing chromium in complex union, obtained by causing agents yielding chromium to react with dyestuffs formed themselves by coupling diazotized amines of the general formula

in which R represents an aryl radical from the group consisting of phenyl and naphthyl and in which the hydroxyl-group stands in ortho-position to the amino-group, with hydroxynaphthalenes free from carboxyl groups and nitrating the dyestuffs obtained.

5. Dyestuffs containing chromium in complex union, obtained by causing agents yielding chromium to react with dyestuffs formed themselves by coupling diazotized amines of the general formula

in which R represents a phenyl radical and in which the hydroxyl-group stands in ortho-position to the amino-group, which hydroxynaphthalenes free from carboxyl groups and nitrating the dyestuffs thus obtained.

6. Dyestuffs containing chromium in complex union, obtained by causing agents yielding chromium to react with dyestuffs formed themselves by coupling diazotized amines of the general formula

in which R represents a phenyl radical and in which the hydroxyl-group stands in ortho-position to the amino-group, with 2-hydroxynaphthalene and nitrating the dyestuffs thus obtained.

7. Dyestuffs containing chromium in complex union, obtained by causing agents yielding chromium to react with dyestuffs formed themselves by coupling diazotized 4-nitro-2-amino-1-phenol-6-sulfonic acid with 2-hydroxynaphthalene and nitrating the dyestuff thus obtained, which dyestuffs containing chromium in complex union are violet-black powders easily soluble in water to violet-red solutions and dyeing wool brown-red tints of good fastness properties.

FRITZ STRAUB.
HERMANN SCHNEIDER.